(12) United States Patent
Bittinger et al.

(10) Patent No.: US 6,296,277 B1
(45) Date of Patent: Oct. 2, 2001

(54) INTEGRAL PASSENGER RESTRAINT SYSTEM

(75) Inventors: D. Scott Bittinger, Fenton; Michael J. Larson, Shelby Township; Alexander L. Dominique, Rochester Hills, all of MI (US)

(73) Assignee: Chrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/080,418

(22) Filed: May 18, 1998

(51) Int. Cl.⁷ .................................................. B60R 21/00
(52) U.S. Cl. ........................ 280/748; 280/728.2; 280/752
(58) Field of Search ..................................... 280/748, 752, 280/751, 728.2, 753; 180/90; 296/189, 191, 70

(56) References Cited

U.S. PATENT DOCUMENTS

| | | | |
|---|---|---|---|
| 3,924,707 | * | 12/1975 | Renner et al. ......................... 180/90 |
| 4,709,943 | * | 12/1987 | Yoshimura et al. ................. 280/751 |
| 4,893,834 | * | 1/1990 | Honda et al. ......................... 280/751 |
| 5,405,163 | * | 4/1995 | Amamori et al. ................. 280/728.2 |
| 5,413,379 | * | 5/1995 | Koma .................................... 280/752 |
| 5,489,116 | * | 2/1996 | Boag ................................. 280/728.2 |
| 5,518,270 | * | 5/1996 | Hanada et al. ....................... 280/751 |
| 5,533,747 | * | 7/1996 | Rose ................................. 280/728.2 |
| 5,718,453 | * | 2/1998 | Kassel et al. ........................ 280/752 |
| 5,931,520 | * | 8/1999 | Seksaria et al. ....................... 296/70 |
| 5,934,733 | * | 8/1999 | Manwaring ............................ 296/72 |
| 5,951,045 | * | 9/1999 | Almefelt et al. ..................... 280/748 |

FOREIGN PATENT DOCUMENTS 5-229392 * 9/1993 (JP) .

* cited by examiner

Primary Examiner—J. J. Swann
Assistant Examiner—Christopher Bottorff
(74) Attorney, Agent, or Firm—Mark P. Calcaterra

(57) ABSTRACT

The present invention provides an integral passenger restraint system which has the passenger airbag system and knee bolster system integrated into one unit. The passenger airbag system of the present invention has an outer surface which is capped at opposite ends by a pair of end plates. Each end plate has a support zone and at least one crush zone. The support zone serves to cover the outer surface and encapsulate the air bag. The crush zone acts as the impact absorbing medium to absorb the impact from a vehicle passenger's knees during a vehicle crash.

4 Claims, 3 Drawing Sheets

INTEGRAL PASSENGER RESTRAINT SYSTEM

BACKGROUND OF THE INVENTION

1. Technical Field

The present invention relates generally to an integral passenger restraint system and, more particularly, to an integral passenger restraint system which integrates a knee bolster system into a passenger airbag system.

2. Discussion

Conventional vehicles are fitted with passenger airbag systems and knee bolster systems. As shown in FIG. 4, the passenger airbag system 201 generally includes a canister-like housing 200 with two end plates 202. The canister-like housing 200 and end plates 202 encapsulate an air bag (not shown) and are located under the dashboard 204 of the vehicle. The air bag is designed to be deployed upon impact of the vehicle with another object, such as a tree. The knee bolster system 205 comprises two metal plates 206 positioned parallel to one another and also located under the dashboard 204 of the vehicle. The plates 206 are angled such that the edge of each plate 208 faces the knees 214 of a vehicle passenger 220. The plates 206 are supported by the dashboard 204 and the cross car beam 212. The reinforcement plate 210 serves to connect the plates 206 and provide an impact area for the knees 214. The metal plates 206 of the knee bolster system 205 are positioned at opposite sides of the passenger airbag system 201 and parallel to end plates 202.

When the vehicle undergoes a crash condition, the vehicle passenger is accelerated towards the dashboard region of the vehicle. In response to the crash, an airbag (not shown) contained in the passenger airbag system 201 is inflated. The inflated airbag then intercepts the accelerating torso region of the vehicle passenger 220. This interception acts to decelerate the torso region. Likewise, the knee bolster system 205 intercepts the vehicle passenger's knees at the reinforcement plate 210. In response to the impact of this interception, the two parallel plates 206 crush, thereby absorbing the acceleration of the vehicle passenger's knees 214.

However, the present system has some drawbacks. With increased competition, auto manufacturers are forced to decrease manufacturing cost and increase available room in the passenger compartments of manufactured vehicles. The current knee bolster and passenger air bag systems require a large number of components. The large number of these components increases the overall manufacturing cost of the vehicle. Also, the incorporation of the passenger airbag system and knee bolster system in the dashboard region of the vehicle consumes a large amount of available space. This is space could be used for other features such as extra passenger leg room. Furthermore, because the plates 206 are supported by and attached to the cross car beam 212, the cross car beam many times is required to be a purchased-in-assembly part. This means that the IP panel must be purchased with the cross car beam and the knee bolster system intact. The present invention was developed in light of these drawbacks.

SUMMARY OF THE INVENTION

The present invention overcomes these drawbacks by providing an integral passenger restraint system which has the passenger airbag system and knee bolster system integrated into one unit. The passenger airbag system of the present invention has an outer surface which is capped at opposite ends by a pair of end plates. Each end plate has a support zone and at least one crush zone. The support zone serves to cover the outer surface and encapsulate the air bag. The crush zone acts as the impact absorbing medium to absorb the impact from a vehicle passenger's knees during a vehicle crash. The knee bolster system can be tuned to absorb a specific amount of force by incorporating a predetermined number of holes and beads in each crush zone of each end plate. Preferably, each crush zone is tuned in such a way that the crush force on the crush zones, generated by the vehicle passenger's knees, does not exceed 2250 pounds. In another aspect of the present invention, a pair of struts are mounted to the end plates to provide structural integrity of the integral passenger restraint system after airbag deployment and before impact of the vehicle passenger's knees.

Additional advantages and features of the present invention will become apparent from the subsequent description and the appended claims taken in conjunction with the accompanying drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENTS

Figure 1:
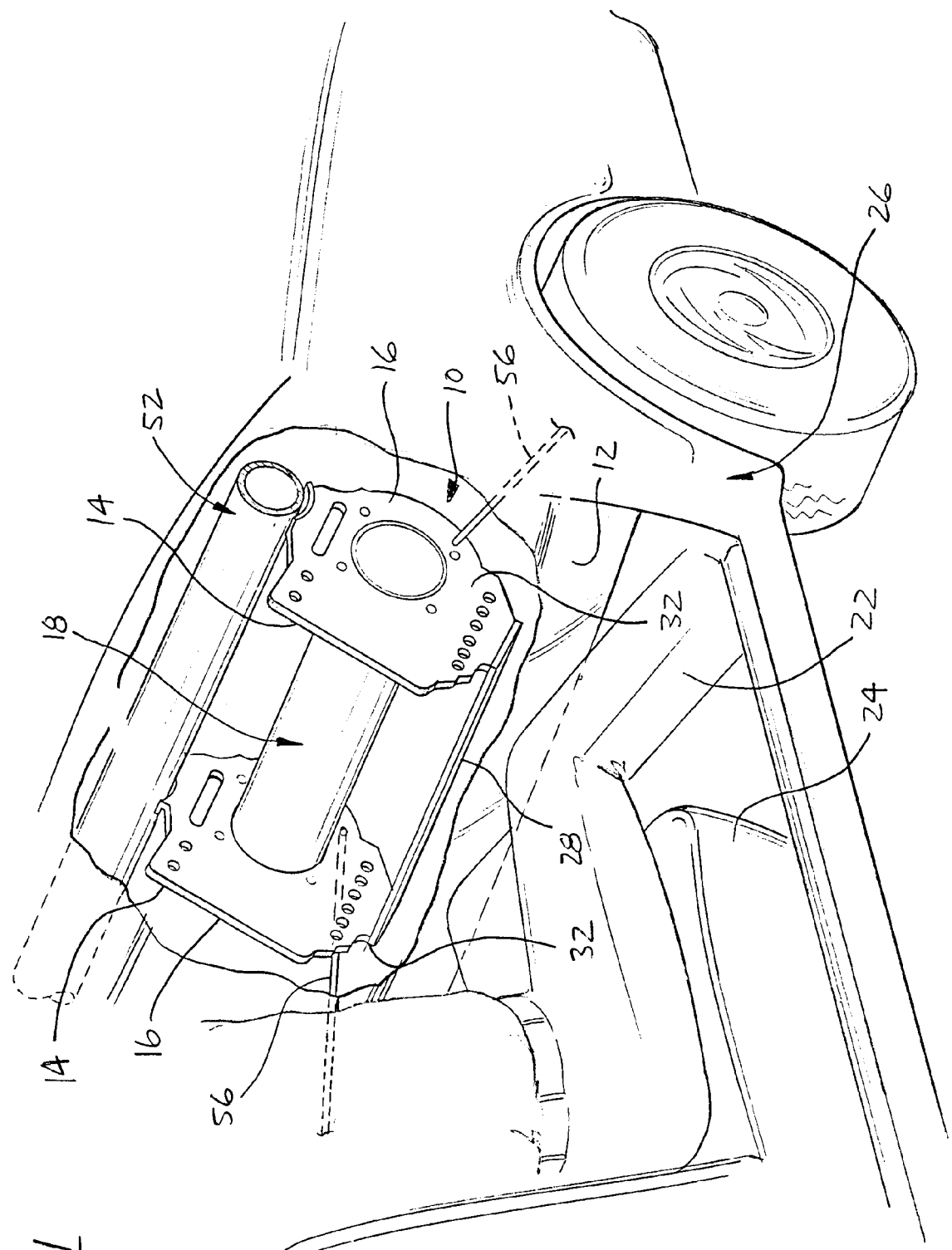
FIG. 1 is a perspective view of a integral passenger restraint system according to the present invention.

With reference to FIG. 1, integral passenger restraint system 10 includes extrusion housing 18, end caps 16, reinforcement plate 28, and cross car beam 62. Integral passenger restraint system 10 is mounted to IP panel 12 at areas 14 on end caps 16. End caps 16 are connected to the end portions of Extrusion housing 18 by welding or other means. Reinforcement plate 28 is attached to the ends of end caps 16. Cross car beam 52 is connected to the frame (not shown) of motor vehicle 26.

Figure 2:
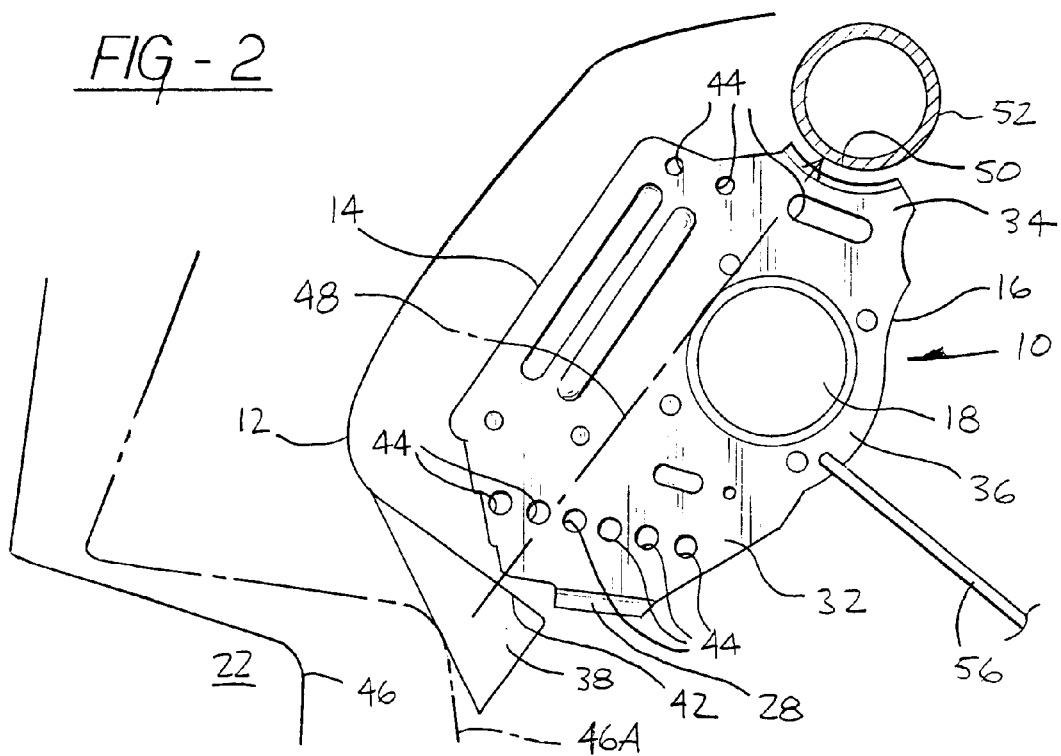
FIG. 2 is a side plan view of an integral passenger restraint system according to the present invention.

With reference to FIG. 2, a description of the knee bolster portion of the present invention is provided. End cap 16 is preferably a steel plate having multiple areas which serve different functions. Specifically, end cap 16 has crush zones 32 and 34, and cap portions 36. Crush zones 32 and 34 serve to absorb the impact of the knees of a vehicle passenger (to be discussed) while the cap portion serves to encapsulate an airbag (as will be discussed). Crush zones 34 are spaced a predetermined distance from cross car beam 52. This allows maneuvering space for assembly of integral passenger restraint system 10 around cross car beam 52. Reinforcement plate 28 is attached to crush zone 32 of end cap 16.

Crush zones 32 and 34 have crush holes 44. Crush holes 44 have a predetermined size, as is well known in the art, such that upon crush zones 32 and 34 being crushed by knees 46 (as will be discussed) during a vehicle crash not exceeding 30 miles per hour, knees 46 never encounter a force of greater than 2250 pounds.

Struts 56 are attached to end caps 16 at one end and IP panel 12 at the other (see FIG. 1). Struts 56 act to maintain the integral passenger restraint system 10 in a fixed relative position to cross car beam 52 and IP panel 12 after airbag 54 (see FIG. 3) has been deployed but prior to interaction of knees 46 with glove box 38 (as will be discussed). The advantage of struts 56 is to allow the integral passenger restraint system to be independent of the vehicle structure of cross car beam 52, thereby allowing for assembly flexibility. Specifically, because integral passenger restraint system 10 is reliant on struts 56 and not on cross car beam 52 for support, cross car beam 52 does not need to be assembled with IP panel 12 before IP panel 12 is assembled with motor vehicle 26.

Figure 3:
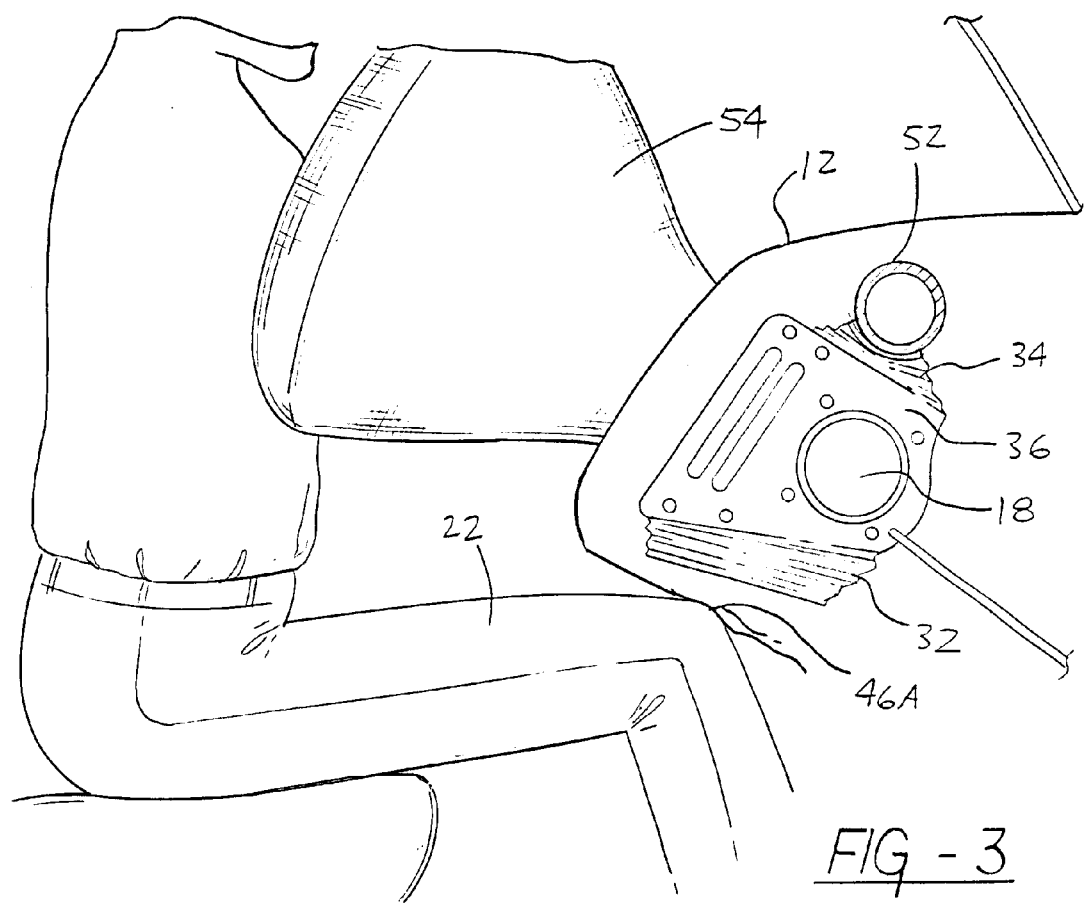
FIG. 3 is a side plan view of an integral passenger restraint system after a vehicle crash condition has occurred according to the present invention.
Figure 4:
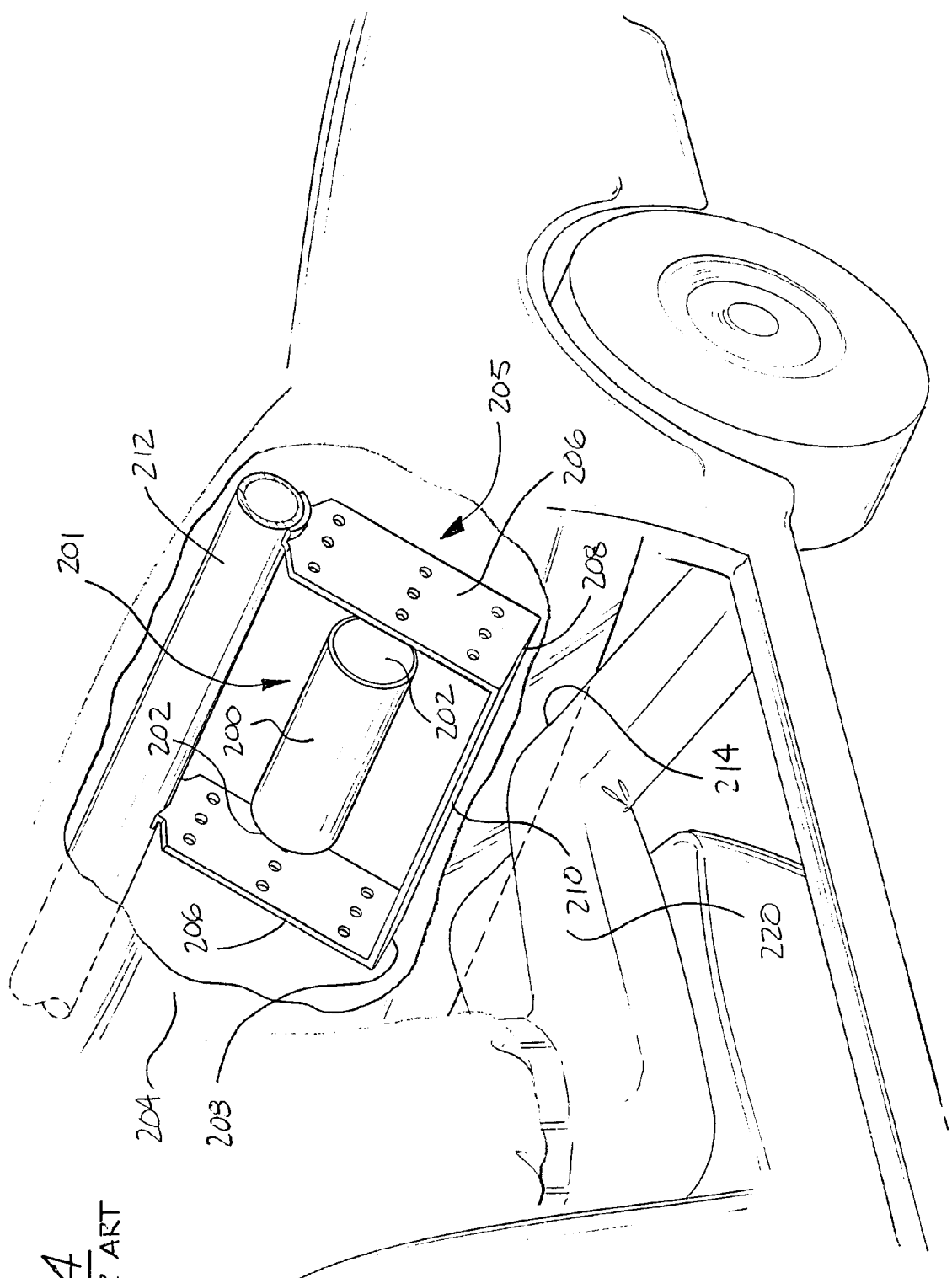
FIG. 4 is a perspective view of a passenger air bag system and knee bolster system according to the prior art.

With reference to FIG. 2 and FIG. 3, the operation of the present invention is now described. In FIG. 2, vehicle passenger 22 is shown sitting in motor vehicle 26 (see FIG. 1). When motor vehicle 26 crashes into another object, vehicle passenger 22 is accelerated toward IP panel 12. In response, airbag 54 (see FIG. 3) inflates, absorbing the crash force of the torso region of vehicle passenger 22. During this absorption, struts 56 remain intact and maintain integral passenger restraint system 10 at its relative position with IP panel 12 and cross car beam 52.

Knees 46 of vehicle passenger 22 accelerate toward dashboard 12 and move to impact position 46a. Knees 46 impact glove box 38 at impact position 46a, creating a force vector described by knee load path 48. Knee load path 48 generally describes the direction of force from knee 46 at impact position 46a, through glove box 38, close out panel 42, and the components of integral passenger restraint system 10, terminating at cross car beam 52. Specifically, knees 46, impact and crush glove box 38. Glove box 38 impacts close out panel 42 and reinforcement plate 28. Reinforcement plate 28 distributes the force generated by knees 46, across both crush zones 32. Crush zones 32 crush and thereby absorb a portion of the impact force generated by knees 46. The remaining force causes areas 14 of end caps 16 to move which causes the struts 56 and the IP panel 12 to deform, thereby allowing portion 50 of crush zone 34 to impact cross car beam 52. In response to portions 50 of crush zones 34 impacting cross car beam 52, crush zones 34 collapse and absorb a portion of the impact force generated by knees 46 which is not absorbed by crush zone 32.

Preferably, crush zones 34 and 32 absorb the entire impact force generated by knees 46, without providing a resistance force on knee 46 which exceeds 2250 pounds. This set of constraints is maintained by incorporating a predetermined number of holes 44, at predetermined sizes, in crush zones 32 and 34. These holes effectively tune crush zones 32 and 34 to collapse under a predetermined amount of load. It is noted that holes 44 may also be beads, darts or other means for reducing the strength of crush zones 32 and 34. These elements may generally be referred to as "geometry."

In FIG. 3, integral passenger restraint system 10 is shown immediately after a vehicle crash condition has occurred. In FIG. 3, vehicle airbag 54 has deployed from extrusion housing 18. Crush zones 32 and 34 have been crushed as shown, and cap portion 36 abuts cross car beam 52.

While the above detailed description described the preferred embodiment of the present invention, it should be understood that the present invention is susceptible to modification, variation and alteration without deviating from the scope and fair meaning of the subadjoined claims.

What is claimed is:

1. An integral passenger restraint system in combination with a motor vehicle, said integral passenger restraint system comprising:

a motor vehicle, said motor vehicle having a front end;

an instrument panel, said instrument panel being located internal to a passenger compartment of said motor vehicle;

a cross-car-beam located between said instrument panel and said front end;

an air bag system having an outer surface;

a pair of end plates, each of said end plates capping an opposite side of said air bag system, each of said end plate having a centrally located support zone attached to said air bag system, each said end plate having a first crush zone located planarly adjacent to said support zone, each said end plate having a second crush zone located planarly adjacent to said support zone and opposite said first crush zone, said first crush zone of each said end plate being located proximate to said cross-car-beam; and a plurality of struts, said struts maintaining a position of said integral passenger restraint system in a fixed position after airbag deployment and prior to impact of a vehicle passenger's knees, said struts supporting said integral passenger restraint system independently of said cross-car-beam.

2. The integral passenger restraint system as claimed in claim 1, wherein said first crush zone and said second crush zone each have a plurality of apertures therein, said apertures allowing said first crush zone and said second crush zone to crush at a predetermined rate and predetermined crush force in response to a vehicle crash condition.

3. The integral passenger restraint system as claimed in claim 2, wherein said crush force is less than 2250 lbs. when said vehicle crash condition occurs when said vehicle is traveling under 30 mph.

4. The integral passenger restraint system as claimed in claim 1, wherein said first crush zone is positioned a predetermined distance away from said cross-car beam.

* * * * *